United States Patent [19]

Shott

[11] 3,983,407

[45] Sept. 28, 1976

[54] VOLTAGE-ADJUSTING ELECTRICAL PLUG

[75] Inventor: George W. Shott, Fords, N.J.

[73] Assignee: Lawrence Peska Associates, Inc., New York, N.Y.

[22] Filed: July 26, 1974

[21] Appl. No.: 492,133

[52] U.S. Cl. .............................. 307/146; 200/51 R

[51] Int. Cl.² .............................. H02J 4/00

[58] Field of Search ............ 200/51 R, 61.47, 61.52, 200/183, 185; 339/32 M; 307/146

[56] References Cited

UNITED STATES PATENTS

| | | | |
|---|---|---|---|
| 3,161,738 | 12/1964 | Hall | 200/61.52 |
| 3,247,358 | 4/1966 | Schmidt | 200/61.52 |

*Primary Examiner*—David Smith, Jr.

[57] ABSTRACT

Means for connecting an electrical load system to a voltage source of a predetermined first voltage level for the operation of said system at optionally one of said first voltage level and a lower second voltage level, said means comprising an electrical plug element comprising a housing member, electrical conductor prongs extending from said housing member, and electrical conductor means electrically connected at one end thereof to said load system, said conductor means comprising separate first and second conductor paths electrically connected to respectively first and second said conductor prongs, said first conductor path comprising parallel first and second circuit paths electrically connected to said conductor prong associated with said conductor path, one of said circuit paths comprising an electrical rectifier element and another of said circuit paths comprising switching means that is open when said plug element is at a first orientation at said voltage source and closed when said plug element at a second such orientation.

4 Claims, 4 Drawing Figures

VOLTAGE-ADJUSTING ELECTRICAL PLUG

BACKGROUND OF THE INVENTION

The present invention relates to an electrical conductor, particularly to one comprising a plug and that can be used to select the voltage to a load. U.S. Pat. Nos. 3,234,342; 2,957,955; 2,797,337; and 3,317,880 pertain hereto.

Prior art devices for adjusting the voltage level applied to a load require the use of mechanical components that are relatively susceptible to failure and, further, generally require, in comparison, extensive manipulation. The present invention significantly alleviates these drawbacks and further provides substantial advantages, including simplicity of design and manufacture.

SUMMARY OF THE INVENTION

The electrical conductor means of the invention includes a plug element in conjunction with parallel first and second circuit paths that are electrically connected to a conductor prong of the plug, one of the circuit paths comprising switching means (preferably, a mercury switch that is on in one position and off in another) and another circuit path comprising an electrical rectifier element.

PREFERRED EMBODIMENT

Figure 2:
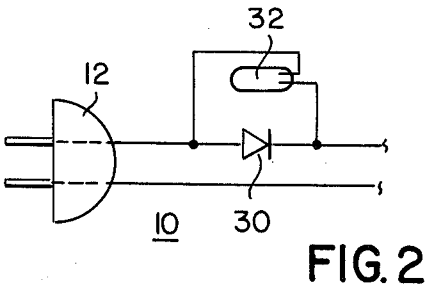
FIG. 2 is a schematic representation of the present invention.

Referring to the figures, the adjustable electrical conductor means 10 comprises an electrical plug element 12, that in turn, comprises a housing member 14 (which can be solid with the other parts molded therein, for example, or can be hollow, containing such other parts), electrical conductor prongs 16, 18 that extend from the housing member 14 with one end 16*a*, 18*a* of each prong 16 in the housing member 14, and electrical conductors means 20 (e.g., an electrical cord) that is electrically connected at one end thereof to the electrical load (not shown) to which the electrical potential is supplied.

Figure 1:
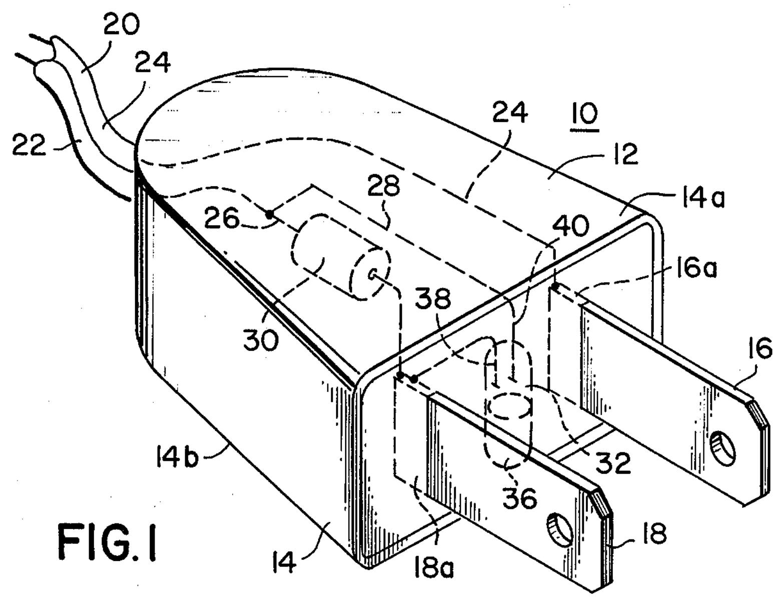
FIG. 1 is a perspective view of electrical conductor means with the first and second circuit paths shown in phantom view.
Figure 3:
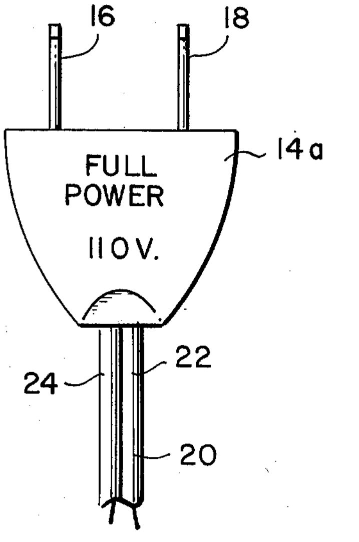
FIGS. 3 and 4 are top views of the present invention in different operating positions.
Figure 4:
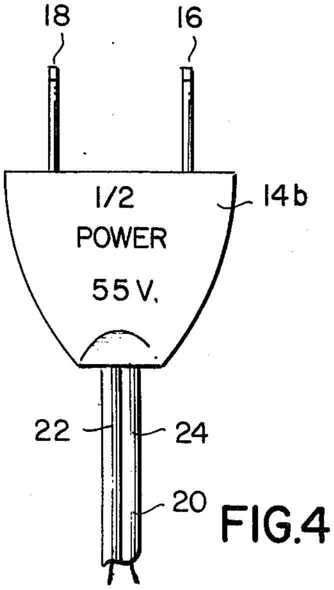

The conductor means 20 comprises first and second conductor paths, e.g., 22, 24 respectively, that are electrically connected respectively to the ends 18*a* and 16*a* respectively of the prongs 18. A first conductor path, e.g., 22, comprises parallel first and second circuit paths 26, 28 that are connected to their associated conductor prong, e.g., 18. One of the circuit paths, i.e., 26, comprises an electrical rectifier element 30 and another circuit path 28 that comprises switching means 32 that is open when the plug element 12 is in a first position or orientation at the outlet (i.e., that shown in FIGS. 1 and 4) and is closed when the plug element 12 is at a second position (FIG. 3, where the plug element 12 of FIG. 1 is turned 180 degrees).

According to a preferred embodiment, the rectifier element 30 is a diode, a mercury switch (where the position of the mercury 36 with respect to the electrodes 38, 40 thereof which electrodes 38, 40 are part of the second circuit path 28 — determines the conductive status — on or off — thereof) constituting the switching means 32. When the plug element 12 is in the position shown in FIGS. 2 and 4, the switch means, or element, 32 is closed so that the electricity from the outlet (not shown) is conducted by the first circuit path 26, which results in the rectifier element 30 permitting, for A.C., only part of the applied voltage to pass so that the resulting voltage is about one-half that of the outlet voltage (e.g., with a 110 volt outlet, about 55 volts reaches the load). When, on the other hand, the plug element 32 is rotated 180 degrees and inserted in the electrical outlet (FIG. 3); the mercury (or other conductive liquid of the switching means 32) short circuits the electrodes 38, 40 so that the electricity is carried to the load via the less resistive second circuit path 28, resulting substantially no voltage drop below the voltage of the electrical outlet, i.e., for a standard 110 volt (A.C.) line, the voltage to the load would be about the same.

It can thus be seen that the present invention can be utilized to conserve electrical energy and/or for regulating the speed of a motor load, e.g., a drill or electric mixer, merely by adjusting the orientation of the plug element 12 in its mounted position.

The present invention, although described in terms of a male plug, can be embodied in a female plug as well, the conductor prongs of the male plug being replaced by female receptacles for receiving such prongs. As used herein, including the claims, the term "conductor prongs" is defined to include such female receptacles for receiving male prongs. Where it is desired, the inscriptions shown in FIGS. 3 and 4 can be provided on the plug element 12 to permit the user's ready and simple selection of the desired voltage level.

Having herein described the invention, what is claimed as new is:

1. Means for connecting an electrical load system to a voltage source of a predetermined first voltage level for the operation of said system at optionally one of said first voltage level and a lower second voltage level, said means comprising an electrical plug element comprising a housing member, electrical conductor prongs extending from said housing member, and electrical conductor means electrically connected at one end thereof to said load system, said conductor means comprising separate first and second conductor paths electrically connected to respectively first and second said conductor prongs, said first conductor path comprising parallel first and second circuit paths electrically connected to said conductor prong associated with said conductor path, one of said circuit paths comprising an electrical rectifier element and another of said circuit paths comprising switching means that is open when said plug element is at a first orientation at said voltage source and closed when said plug element at a second such orientation, said switching means being vertically disposed so that said first and second orientations are 180 degrees apart with respect to the principal axis of said housing member.

2. Electrical connecting means as in claim 1, wherein said switching means comprises a liquid conductor switch.

3. Electrical connecting means as in claim 1, wherein said switching means comprises a mercury switch.

4. Electrical connecting means as in claim 1, wherein said rectifier element comprises a diode.

* * * * *